May 31, 1960  T. A. RICH  2,938,423
INCIPIENT FOG DETECTOR
Filed June 27, 1956

Inventor:
Theodore A. Rich,
by Merton D. Moore
His Attorney.

United States Patent Office 2,938,423
Patented May 31, 1960

2,938,423

INCIPIENT FOG DETECTOR

Theodore A. Rich, Scotia, N.Y., assignor to General Electric Company, a corporation of New York Filed June 27, 1956, Ser. No. 594,298

1 Claim. (Cl. 88—14)

This invention relates to an apparatus for detecting fogs. More specifically, it relates to an apparatus for detecting potentially foggy conditions.

In many areas of activity it is highly desirable to obtain accurate information regarding fog conditions. Transportation facilities such as airports, highways, harbors, etc. are extremely sensitive to such conditions and are in urgent need of methods and devices capable of furnishing reliable indications thereof. Especially critical is the need for devices which will provide warning of potential or incipient fogs before they reach the visible stage.

The formation of visible fog is dependent on several interrelated conditions, each of which is critical in its formation. These conditions are temperature, the amount of water vapor in the air, and the presence of condensation nuclei. It has been previously observed that the condensation of water vapor in air does not take place in the absence of condensation nuclei at values of supersaturation below 400%, a condition which would normally never occur under normal atmospheric conditions. The nuclei serve as centers about which water droplets form and unless they are present, no condensation will generally occur except at remarkable degrees of supersaturation.

If the humidity tends to rise above 100%, as occurs by the mixture of two saturated air masses already at 100% or by the cooling of an air mass, condensation starts the deposition of water on the nuclei, which will continue until the humidity is lowered to an equilibrium condition of substantially 100% relative humidity for the new temperature. The relative humidity necessary to start condensation on small particles or droplets is shown in the following table:

Size: Relative humidity, percent
$10^{-6}$ cm. radius _____ 112
$10^{-5}$ cm. radius _____ 101
$10^{-4}$ cm. radius _____ 100.1

It is possible for the condensation of water vapor to take place at less than 100% relative humidity under certain conditions. However, these conditions are restricted and self-limiting. For example, there may be an increase in the size of nuclei by the absorption of water as the humidity changes to keep them in equilibrium with the ambient which is influenced by hygroscopic forces or porosity. However, this absorption of water may fill pores or dilute the solution, if liquid, and is thus self-limiting.

In a similar fashion, if a small salt particle is present in the air, at 50% humidity for example, it will probably be present in its crystalline form. If the humidity rises to approximately 75%, the crystal, due to its hygroscopic character, will start to take up water vapor and as the humidity increases, becomes a liquid drop. This process is, however, self-limiting since as it absorbs water vapor it becomes successively more diluted and consequently loses its hygroscopic character. Thus, if the size is increased ten times by water absorption the amount of salt would only be one thousandth of the total and would in effect act as a water drop.

By artificially inducing condensation of the water vapor about the condensation nuclei present in the air it is possible to determine the fog potential of any given atmospheric condition as measured by the amount of expansion needed to produce a fog, and consequently provide a simple index of meteorological conditions.

It is an object of this invention, therefore, to provide an apparatus for detecting incipient foggy conditions.

It is another object of this invention to provide an apparatus which detects and indicates both potential fog and foggy conditions.

A further object of this invention is to provide an apparatus which is sensitive to a wide range of potentially foggy conditions.

Other objects and advantages will appear as the description of the invention proceeds.

The invention, briefly speaking, comprises an apparatus responsive both to humidity and condensation nuclei levels of the air. Samples of air are periodically drawn into an air-tight chamber and are periodically subjected to a small expansion of the volume. If the humidity and condensation nuclei level of the air samples is such as to be very near a foggy condition the small expansion of the air sample will cause a supersaturation thereof and condensation of the water vapor about condensation nuclei. The cloud of droplets thus formed is irradiated by a beam of radiant energy whose intensity variations are detected by means of a radiation sensitive system to provide an electrical signal as an indication of the potential fog. If the humidity and condensation nuclei levels of the air samples are not such as to be near a foggy condition, it is obvious, of course, that the small expansion of the sample will fail to form a cloud of droplets and no indications will be produced.

In order to increase the flexibility of the apparatus and to provide indications of a wide range of potentially foggy conditions, it is possible to vary the amount of expansion of the air samples for successive samples. Thus, it is feasible to expand the successive air samples to larger and larger degrees until a cloud of droplets is formed indicating for what given amount of expansion a fog will occur. By correlating the amount of expansion necessary in order to produce the cloud of droplets in the chamber, it is thus possible to determine the degree of incipiency of the fog.

By means of this novel method and apparatus it becomes practical for the first time to detect potentially foggy conditions and to delineate precisely how near the potential fog is.

The features of this invention which are believed to be novel and patentable are pointed out in the claims which form a part of this specification. For a better understanding of the invention, however, reference is made in the following description to the accompanying drawings in which:

Figure 1:
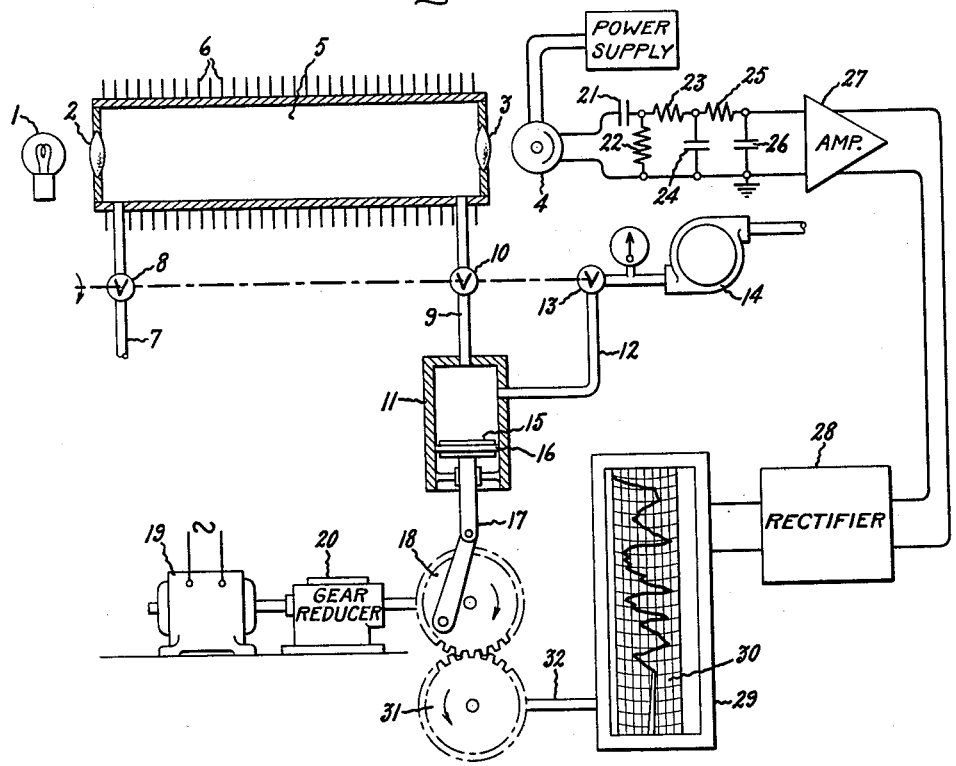
Figure 1 shows a view partially in cross-section of the novel fog detector.

Referring now to Figure 1 there is provided a chamber into which air samples representing external conditions are periodically introduced. There is shown an optical system comprising a source of radiant energy such as an incandescent lamp 1, energized from a 60 cycle source, not shown, and lenses 2 and 3 which focus the radiant energy on a radiation sensitive device such as a phototube 4. The radiant energy traverses a chamber 5 having cooling fins 6 along the surface thereof, in order to maintain the air sample at ambient temperature. The chamber 5 is connected to an input conduit 7 through a valve 8 to permit the introduction of the air samples at the rate depending on the speed of response desired. The chamber 5 is connected to a second chamber 11, having a variable volume, through a conduit 9 and a valve 10. The variable volume chamber 11 may be evacuated by means of a pump 14 to which it is connected by means of a conduit 12 and a valve 13. The variable volume chamber 11 in conjunction with the pump 14 and the valves 10 and 13 operates to expand the air sample in the chamber 5 to provide for the formation of droplet clouds therein if the humidity and condensation nuclei level of the air sample is such as to represent a potentially foggy condition.

There is provided, in order to permit the detection of a wide range of incipient foggy conditions, a means for varying the volume of the second chamber and consequently for varying the amount of expansion to which the air samples are subjected. The volume of chamber 11 may be adjusted by means of a piston 15 having a sealing ring 16 and connected to an eccentric linkage 17. The linkage 17 is driven by a gear 18 which is driven by a motor 19 through a gear reducing means 20. As will be explained in greater detail later, the volume of chamber 11 is cyclicly varied by means of the driving motor 19 and the eccentric linkage 17.

There is also provided a means for generating a periodic electrical signal proportional to the variation in intensity of the radiant energy traversing chamber 5 and means for indicating these signals as an index of an incipient fog. The output of the radiation sensitive device 4 is connected to the input of an A.C. amplifier 27 through a resistance-capacitance coupling network consisting of a capacitance 21 and a resistance 22 and a 120 cycle resistance-capacitance filter. The 120 cycle filter includes resistances 23 and 25 and capacitances 24 and 26 and functions to filter out those signal components from the radiation sensitive device 4 due to the 120 cycle flicker from the light source 1, thus permitting only electrical signals generated due to the periodic expansion of the air samples within the chamber.

The output of the amplifier 27 is coupled to a rectifying element 28 which provides a direct current output for actuating the pen of a recording instrument 29. The recording instrument 29 is of standard configuration and comprises a carriage which imparts movement to a sheet of graph paper 30 which moves relative to the recording pen. The carriage of the recorder 29 is driven in synchronism with the piston 15 of the chamber 11 by means of a shaft 32 and a gear 31 which engages the same gear that drives the eccentric linkage 17. It should be pointed out that it is not essential that a rectifier element be utilized in the output circuit of the amplifier 27. If a D'Arsonval type of recorder is utilized it would be possible to disperse both with the rectifier and the 120 cycle filter and still obtain the desirable indication from the recorder.

The rotary valves 8, 10, and 13 are mounted on a common shaft and are driven by a motor, not shown, in a sequence of operations which permits a periodic testing of the incoming air samples. The valves may consist of a cylindrical rotor of chrome plated stainless steel having milled out sections which connect together ports in a brass stator. Thus by rotating the cylindrical rotor the valves are sequentially operated depending on the specific manner in which the rotor is constructed. The precise sequence in which the valves are operated will be explained in detail later in conjunction with a description of the operation of the apparatus.

Referring now to the operation of the invention, the following sequence of events takes place. Valves 8, 10, and 13 are opened and a sample of air is taken in through the conduit 7 and the valve 8 while the previous sample is exhausted through the pump 14. Valves 10 and 13 are then closed and air continues to flow into the chamber 5 until inlet pressure is reached. Valve 8 is now closed and valve 13 is opened. The valve 13 being opened, pump 14 evacuates the chamber 11. Valve 13 now closes and valve 10 opens. The opening of valve 10 permits the air sample within the chamber 5 to expand into the chamber 11. The sudden expansion of the air sample cools the air in the chamber. If the amount of expansion is sufficient for the given humidity and condensation nuclei level of the air sample, the water vapor in the air condenses about the nuclei and a cloud of droplets is formed within the chamber 5.

The cloud of droplets attenuates the beam of light traversing the chamber, and produced by the incandescent lamp 1, and as a result there will be an instantaneous drop in the output signal of the radiation sensitive device 4. This pulsating signal is coupled through the resistance-capacitance coupling circuit to the input of the amplifier 27. The 120 cycle filter has no effect on this signal, the frequency of which is low since the capacitances 24 and 26 have a very high impedance at low frequencies. Consequently, any pulsating signals due to periodic formation of droplet clouds in the chamber will be passed directly into the amplifier 27. The output of the amplifier is connected to the input of a rectifier 28 which produces at its output terminal 8 a direct current signal which drives the pen mechanism of the recorder 29. The pen mechanism will then produce an indication on the graph paper 30 that a cloud of droplets has been formed within the chamber 5. By properly indexing the graph paper with the degree of expansion of the chamber 11 it is possible to determine what degree of expansion was necessary to cause the formation of the cloud.

Up to this point it has been assumed that a cloud of droplets has been formed with the first given expansion. Assuming, however, that the condensation nuclei and humidity levels of the air sample are not sufficiently high to cause the formation of said cloud with said first degree of expansion, successive samples are then drawn into the chamber at the desired rate and are subjected to varying degrees of expansion. This is achieved by virtue of the movable piston member 15 in the chamber 11. The piston 15 is moved in a reciprocating fashion within the chamber 11 by means of the eccentric linkage 17. This reciprocating movement of the piston is controlled by means of a driving motor 19 and a gear reducing element 20 which drives the gear 18 to which the linkage 17 is attached. The rate of reciprocal movement of the piston 15 is related to the frequency of operation of the valve members 8, 10, and 13. That is, if the frequency of air sampling is 5 times per second, the rate of movement of the piston is made some fraction of that, as for example, 1/20 of a cycle. Thus, the valves 8, 10, and 13 may be operated through 100 cycles of this operation while piston 15 is operated through one cycle of its movement. Thus, for successive air samples that are going into the chamber 5, differing degrees of expansion are provided by virtue of the movement of the piston 15 to either contract or expand the volume of the chamber 11. That is, air samples admitted to chamber 5 are subjected first to successively increasing degrees of expansion and then to successively decreasing degrees of expansion as the piston 15 first moves downward and then upward in its cycle of operation. In this manner it is possible to determine from the output of the electrical circuit and its associated recorder 29 precisely at what percentage of expansion a cloud of droplets is finally formed within the chamber 5. By noting the amount of expansion necessary to achieve this cloud of droplets it can be determined just how close to a foggy condition the air being tested is.

This may be done by marking the graph paper 30 on the recorder 29 with index marks representing percentages of expansion. This may be done since the carriage of the recorder is driven by means of the shaft 32 and the gear 31 at a speed such that it moves the same linear distance for each cycle of operation of piston 15.

In order to prevent 60 cycle flicker from the incandescent light source 1 from affecting the recorder a 120 cycle filter comprising the resistances 23 and 25 and the capacitances 24 and 26 is connected to the input of the amplifier 27. Thus, any light variations due to 60 cycle flicker in the light source is by-passed to ground and does not appear at the input amplifier 27 and consequently does not affect the indications presented by the recording instrument 29.

In the embodiment of the invention shown in Figure 1, the light beam, the intensity of which is varied by the cloud of droplets, is projected directly onto the photoelectric device 4, and consequently the periodical appearance of the droplet cloud operates to attenuate the light beam. It is also possible, in an alternative embodiment, to utilize an optical system in which the periodic appearance of the cloud functions to scatter a light beam and to produce a periodic electrical signal in the output of the photoelectric device due to the scattering.

Figure 2:
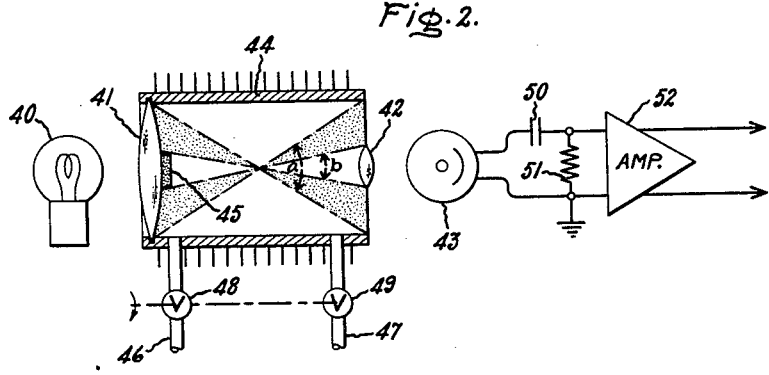
Figure 2 shows an alternative embodiment of the fog detector.

Referring now to Figure 2 there is illustrated an alternative embodiment of the fog detecting apparatus in which a system of dark field illumination is utilized to detect the incipient foggy condition. That is, optical means are provided for projecting a beam of light through the chamber in the form of a cone of light containing a cone of darkness within the cone of light. To this end, there is provided a chamber 44 connected to an inlet conduit 46 through a valve 48 and to an outlet conduit 47 through a valve 49. An optical system is provided consisting of a source of radiant energy such as an incandescent lamp 40, energized from a 60 cycle source, not shown, a condensing lens 41 at one end of said chamber and a second condensing lens 42 mounted in an opaque wall, for projecting a beam of light through the chamber. Adjacent to one face of the condensing lens 41 is an opaque light barrier 45 so positioned that no direct light path from the lamp 40 impinges on the cell 43. Thus there is produced a cone of light subtending an angle "a" as shown in Figure 2. However, due to the light barrier 45 there is produced within the cone of light "a" a cone of darkness subtending an angle "b" which is smaller than the cone angle "a," as is illustrated in Figure 2. The condensing lens 42 is positioned so as to lie within the cone of darkness and as a consequence no light is projected through in the absence of a cloud of droplets.

Positioned adjacent to the lens 42 is a radiation sensitive element such as a photoelectric device 43 which intercepts any scattered light projected through the lens 42 and produces a periodically varying electromotive force in response thereto. The output of the photoelectric device 43 is applied, by means of a resistance-capacitance coupling circuit comprising a capacitance 50 and a resistance 51, to the input terminal of an alternating current amplifier 52. The output of the alternating current amplifier 52 is coupled, in a fashion similar to that shown in Figure 1, to a recording instrument.

The input and output conduits 46 and 47 are connected to a variable volume chamber identical to that shown in Figure 1. However, for the sake of clarity, only the chamber and the alternative optical system is illustrated in Figure 2, since it is to be understood that the device is to be utilized in an environment such as is shown in Figure 1.

The operation of Figure 2 is as follows: An air sample is drawn into chamber 44 through the conduit 46 and open valve 48. In a manner similar to that of Figure 1 this sample is expanded through the conduit 47 and its associated valve 49 into an auxiliary chamber, not shown, but identical with that of Figure 1. If the humidity and condensation nuclei levels of the air sample are such that condensation occurs with a given expansion, a cloud of droplets will be formed in the chamber 44. The presence of these droplets within the cone of light will cause a scattering of the light into the cone of darkness so that it is projected by means of the lens 42 onto the photoelectric device 43 to produce an output signal. In a manner similar to that described with reference to Figure 1 this signal may be indicated on a recording device to provide an index of the degree of fog incipiency. In the absence of the formation of droplet clouds no light will reach the photoelectric device and no output signal will be produced to activate the recording device.

Thus, as so far described, the operation of the device illustrated in Figure 2 is identical to that of Figure 1. However, by means of the apparatus shown in Figure 2 it is possible to produce an indication in the instance where a fog already exists. That is, assuming that a heavy fog exists, the air samples drawn into the chamber already contain a cloud of droplets and the subsequent expansion may have substantially no effect. These droplets in the chamber again cause a scattering of the light to produce periodic electric signals. However, the frequency of these periodic signals is 120 cycles per second due to the 60 cycle light flicker from the incandescent lamp 40. The output signals from the photoelectric device 43 are applied to the input of the amplifier 52 inasmuch as no 120 cycle filter is utilized in its input. Consequently, there appears at the input of the recording device periodic electromotive forces having a repetition frequency of 120 cycles. These electric signals are recorded on the graph paper to indicate the actual presence of fog. However, it is quite easy to distinguish the two conditions, with an incipient fog condition there will be a range of expansions which produce no scattered light and the recorder will read zero; if a fog exists without expansion the recorder never falls back to zero. Consequently, it is possible by means of the apparatus of Figure 2 to provide a detector which indicates both existing foggy conditions and incipient foggy conditions. If a steady light source is available this same reasoning would apply to Figure 1.

The apparatus of Figure 2 may, in a manner similar to that of Figure 1 be cycled through a range of expansion values, in order to determine precisely at what expansion a cloud of droplets is formed within the chamber. As was pointed out previously, once it is determined what expansion is necessary to cause such droplet formation it may be interpreted as an index of the incipiency of a fog.

It is also possible in the devices of both Figures 1 and 2 to restrict the range of expansions to a desired value in order to accommodate general weather conditions. That is, in an area which is normally highly susceptible to fog and which thus normally requires only a small expansion to produce fog it may be undesirable to permit a large range of expansion since substantially continuous indications of fog incipiency would be achieved. Thus, in such a situation it would be desirable to limit the range of expansion to a very small range of values and to indicate only those which represent a high degree of fog incipiency.

From the foregoing description, it can be appreciated that this invention provides a new method and apparatus for determining potentially foggy situations.

While a particular embodiment of this invention has been shown it will, of course, be understood that it is not limited thereto since many modifications both in the circuit arrangement and in the instrumentalities employed may be made. It is contemplated by the appended claim to cover any such modifications as fall within the true spirit and scope of my invention.

What I claim as new and desire to secure by Letters Patent of the United States is:

In an incipient fog detector, the combination comprising a first chamber means to receive air samples for testing, second chamber means, means to evacuate said second chamber means periodically to a predetermined value of pressure, said last named means including a first valving means to control the evacuation of said second chamber, a second valve means coupled to said first chamber means to permit air samples to flow into said chamber, and third valve means to permit periodic communication between said chambers, means to operate said valve means in a predetermined sequence, means to vary the volume of said evacuated chamber at a predetermined rate to subject successive samples in said first chamber to different degrees of expansion, the rate at which said volume is varied being less than the rate at which said valve means are operated to admit and expand samples in said chambers so that succeeding samples are subjected to different degrees of expansion, and electro-optical means to indicate the presence of droplet clouds in the first chamber.

References Cited in the file of this patent
UNITED STATES PATENTS

| | | |
|---|---|---|
| 1,945,660 | Scott | Feb. 6, 1934 |
| 2,684,008 | Vonnegut | July 20, 1954 |
| 2,732,753 | O'Konski | Jan. 31, 1956 |
| 2,812,686 | Sinclair | Nov. 21, 1957 |